United States Patent [19]

Fisher et al.

[11] Patent Number: 5,245,237
[45] Date of Patent: Sep. 14, 1993

[54] TWO COMPARTMENT MOTOR

[75] Inventors: Lynn E. Fisher; Michael A. Marks; David L. Smith, all of Fort Wayne, Ind.

[73] Assignee: General Electric Company, Fort Wayne, Ind.

[21] Appl. No.: 854,337

[22] Filed: Mar. 19, 1992

[51] Int. Cl.$^5$ .............................................. H02K 5/00
[52] U.S. Cl. ...................................................... 310/89
[58] Field of Search ................. 310/89, 43, 58, 68 R, 310/71, 68 E, 68 A, 85, 112, 52; 200/80 R, 304, 305, 306

[56] References Cited

U.S. PATENT DOCUMENTS

| | | |
|---|---|---|
| 1,857,202 | 5/1932 | Lee . |
| 2,556,675 | 6/1951 | Carnagua . |
| 2,616,682 | 11/1952 | Greenhut . |
| 2,683,844 | 7/1954 | Schaefer . |
| 2,768,260 | 10/1956 | Greenhut . |
| 2,772,894 | 12/1956 | Oats . |
| 2,774,894 | 12/1956 | Antonidis et al. ................. 310/71 |
| 2,777,912 | 1/1957 | Haines, Jr. . |
| 2,811,656 | 10/1957 | Mollenberg . |
| 2,831,153 | 4/1958 | Deming et al. . |
| 2,846,540 | 8/1958 | Neal ...................................... 200/80 |
| 3,315,139 | 4/1967 | Wharton . |
| 3,482,128 | 12/1969 | Keck et al. ........................... 310/71 |
| 3,571,541 | 3/1971 | Bedocs et al. ....................... 200/67 |
| 3,575,562 | 4/1971 | Remke . |
| 3,582,741 | 6/1971 | Arnold et al. . |
| 3,707,637 | 12/1972 | Charlton et al. ................... 310/71 |
| 4,038,574 | 7/1977 | Crow et al. ......................... 310/71 |
| 4,206,959 | 6/1980 | DeVries .......................... 310/71 X |
| 4,296,366 | 10/1981 | Hildebrandt et al. ............ 200/80 R |
| 4,315,118 | 2/1982 | Krämer et al. . |
| 4,386,290 | 5/1983 | Monette ........................... 310/68 E |
| 4,394,553 | 7/1983 | Feil .................................. 200/67 DA |
| 4,414,443 | 11/1983 | Gehrt ............................... 200/80 R |
| 4,513,214 | 4/1985 | Dieringer ............................. 310/71 |
| 4,569,125 | 2/1986 | Antl et al. ....................... 310/71 X |
| 4,593,163 | 6/1986 | Fisher . |
| 4,594,773 | 6/1986 | Frank et al. ......................... 310/89 |
| 4,616,149 | 10/1986 | Best ...................................... 310/71 |
| 4,658,196 | 4/1987 | Hildebrandt ................... 200/80 R |
| 4,665,286 | 5/1987 | Hansen .......................... 200/80 R |
| 4,668,898 | 5/1987 | Harms et al. ..................... 310/67 R |
| 4,670,631 | 6/1987 | Peachee et al. ................. 200/80 R |
| 4,686,401 | 8/1987 | Gehrt ............................... 200/80 R |
| 4,883,982 | 11/1989 | Forbes et al. ................... 310/68 R |
| 5,006,744 | 4/1991 | Archer et al. ....................... 310/89 |
| 5,068,555 | 11/1991 | Oberdorfer-Bogel ............... 310/52 |

FOREIGN PATENT DOCUMENTS

| | | |
|---|---|---|
| 618492 | 4/1961 | Canada . |
| 54-122804 | 9/1979 | Japan . |
| 54-137601 | 10/1979 | Japan . |
| 1016119 | 1/1966 | United Kingdom . |

Primary Examiner—Steven L. Stephan
Assistant Examiner—Ed To
Attorney, Agent, or Firm—Ralph E. Krisher, Jr.

[57] ABSTRACT

A two compartment motor has a frame, a pair of end shields disposed adjacent opposing ends of the frame to define a first compartment, a stator winding supported by the frame within the first compartment, an armature rotatably supported by the end shields and disposed within the first compartment adjacent the stator winding, a cover mounted to the motor adjacent one of the end shields to define a second compartment between the cover and the end shield, and a control plate mounted within the second compartment. The control plate serves as a mounting surface for securing a plurality of electrical components used in the control and operation of the motor in position within the second compartment. The control plate is a molded plastic component having integrally formed mounting mechanisms for at least one of the electrical components. The electrical components may include a starting capacitor, voltage and/or speed control switches, an overload device and electrical terminals. Ventilation openings, lead openings and shields may also be integrally formed in the control plate. The plate may be provided with recesses to accommodate electrical connectors, a centrifugal switch and other components. A method of assembling the motor includes mounting the plurality of components to the control plate to form a sub-assembly prior to connecting this sub-assembly to the other components of the motor.

29 Claims, 7 Drawing Sheets

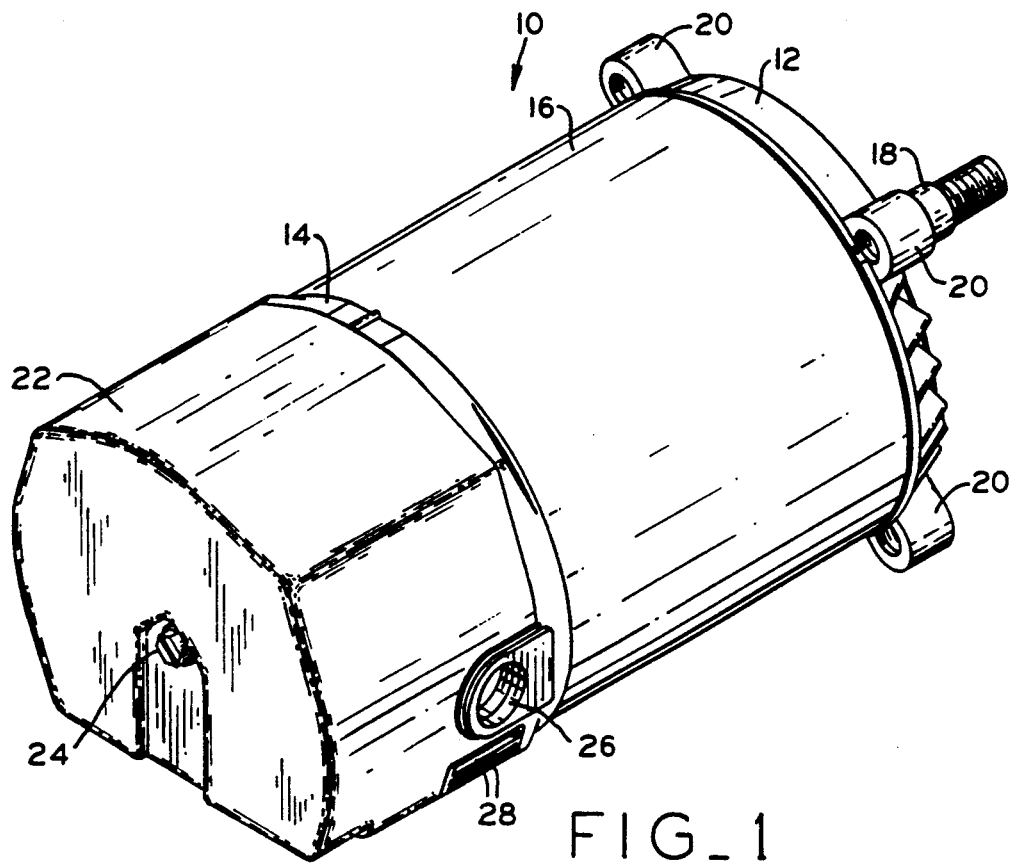
FIG_1
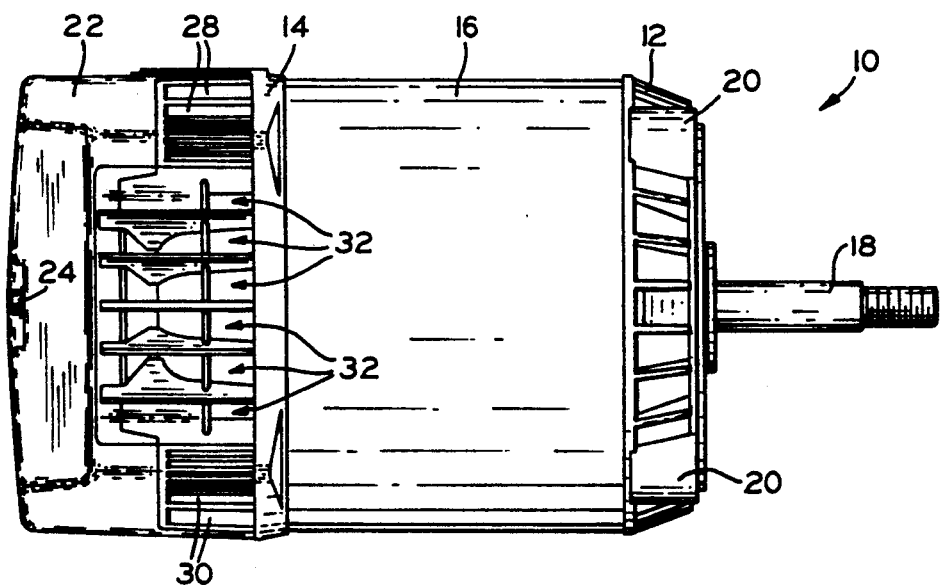
FIG_2

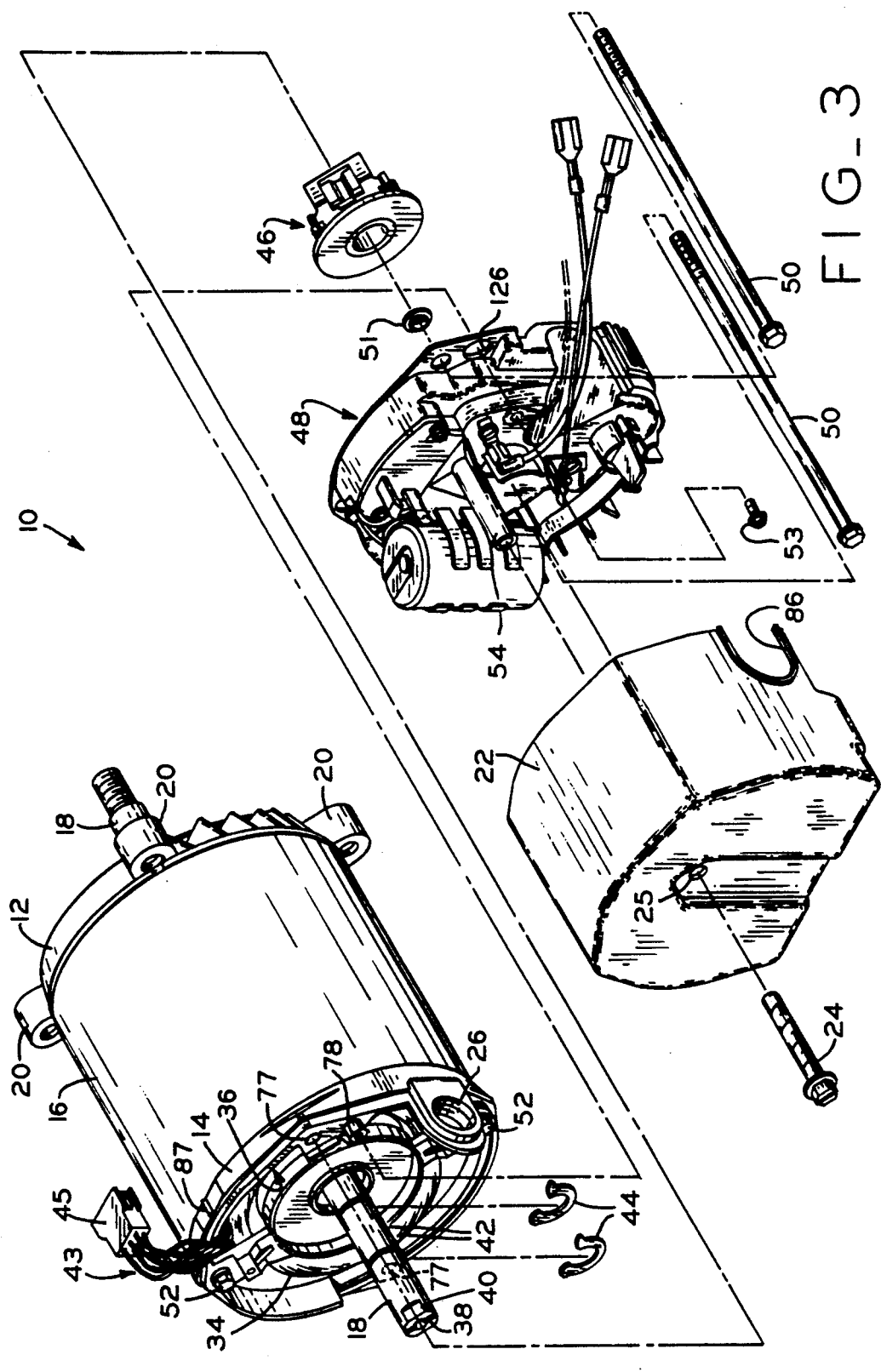

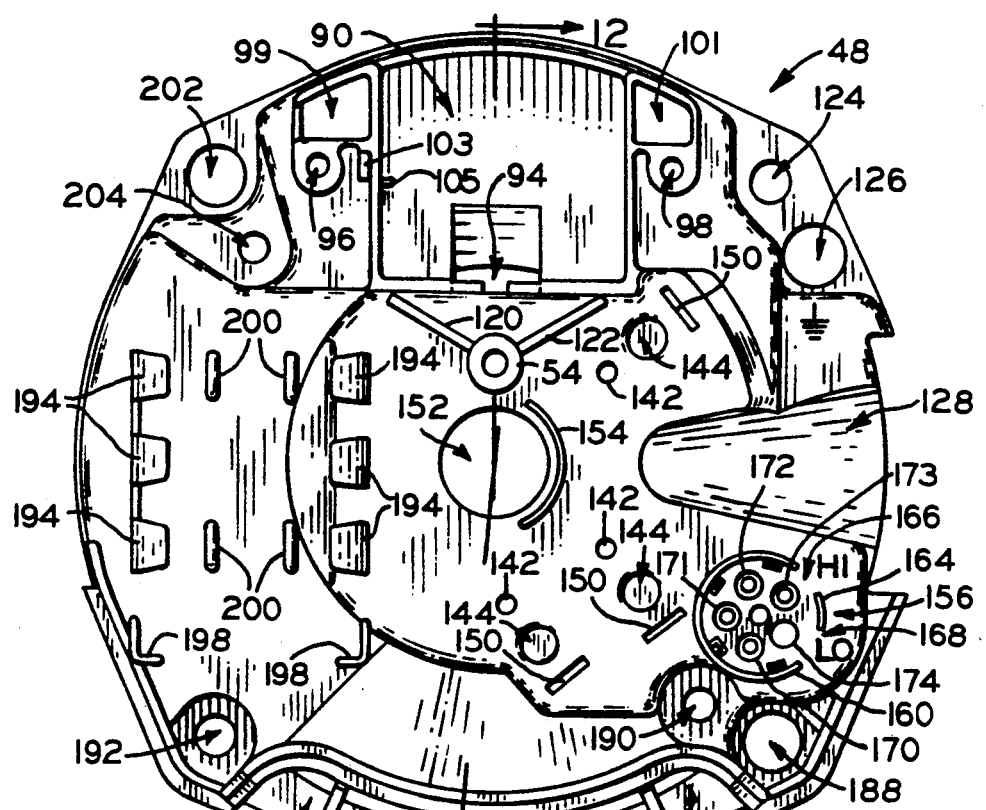
FIG_6
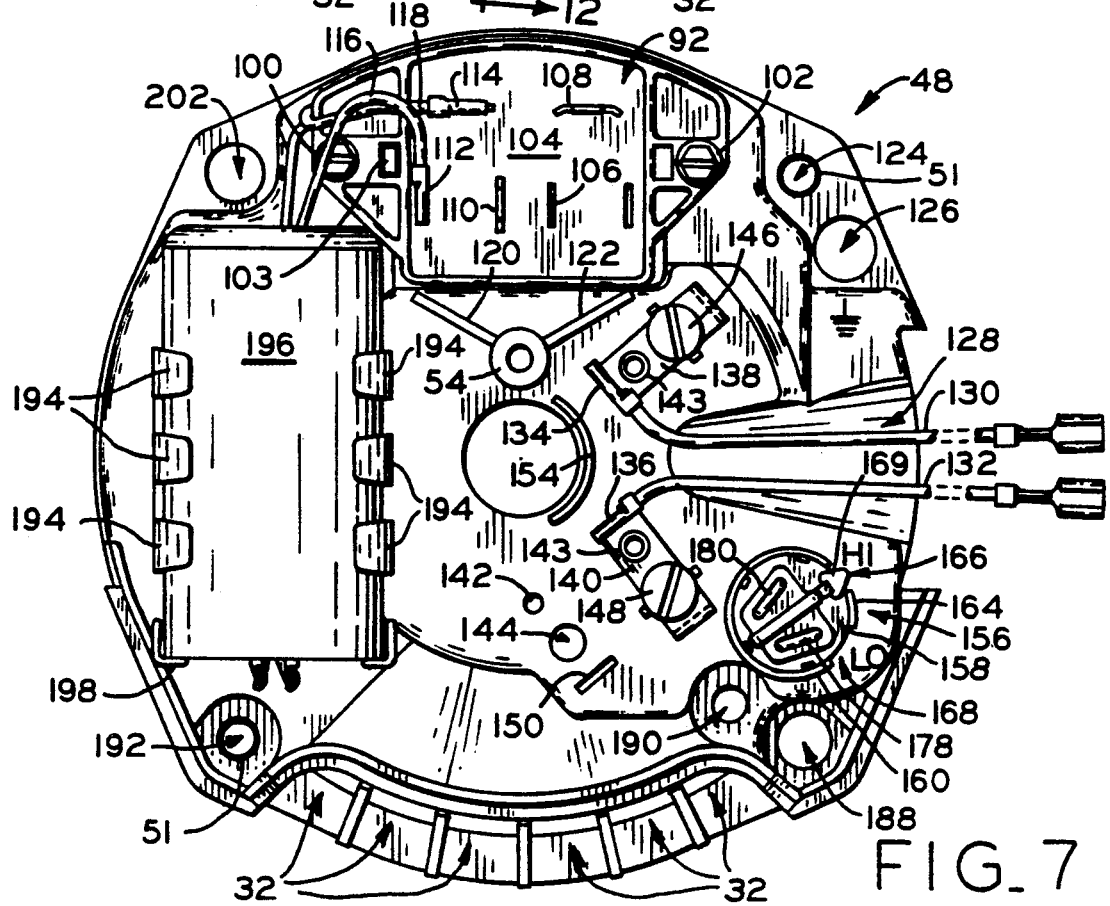
FIG_7

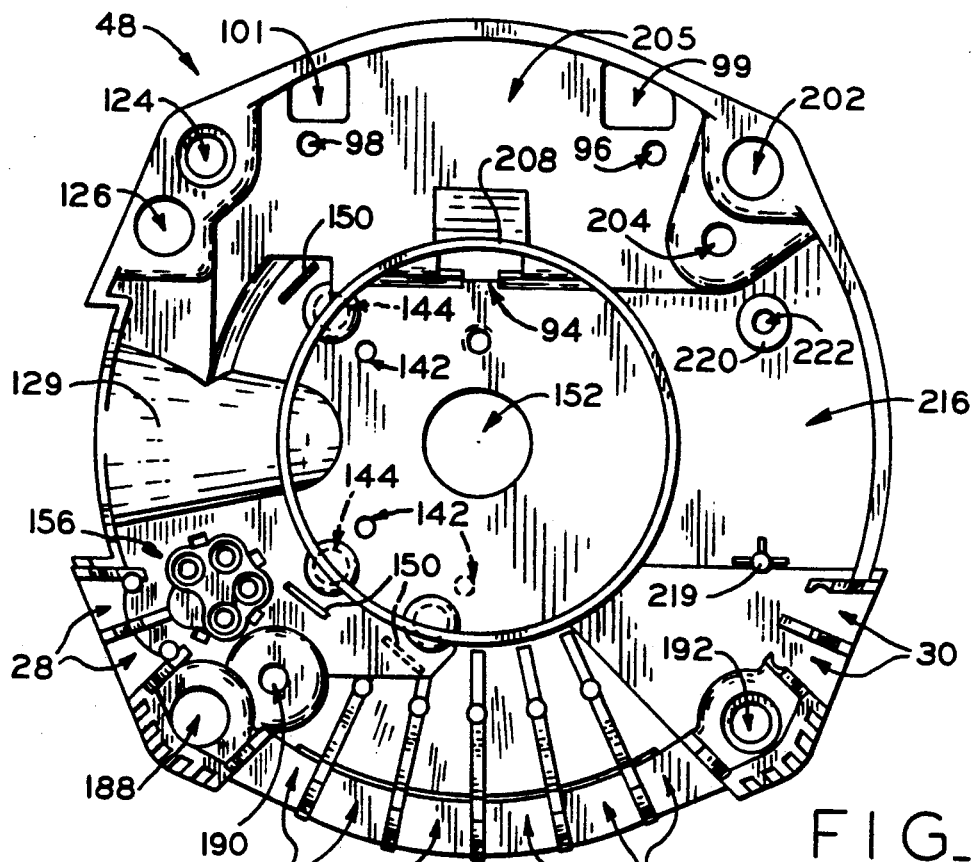
FIG_8
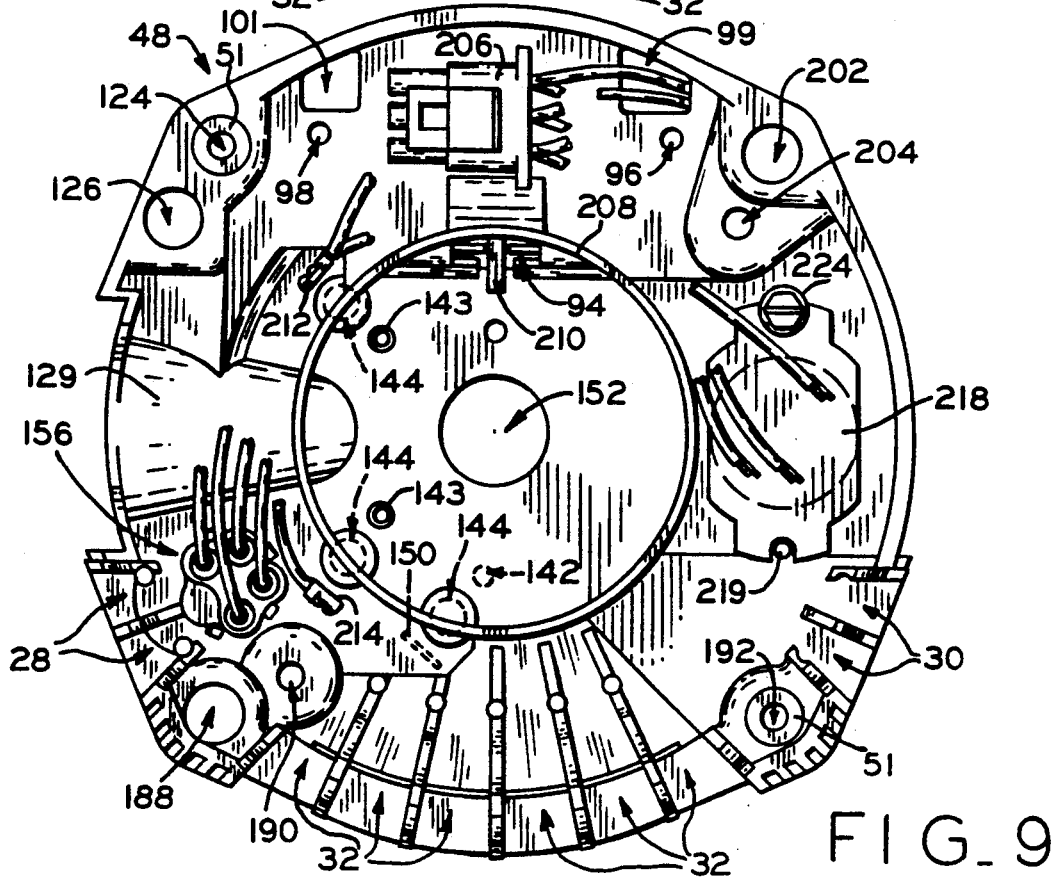
FIG_9

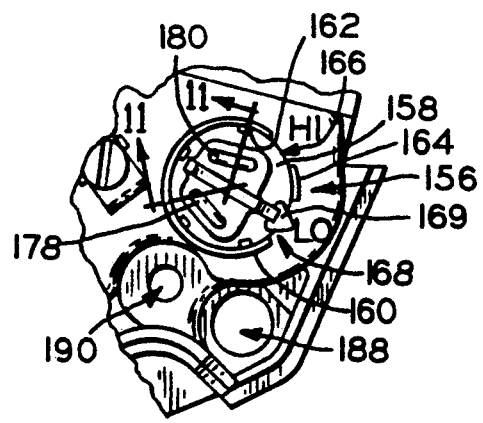
FIG_10
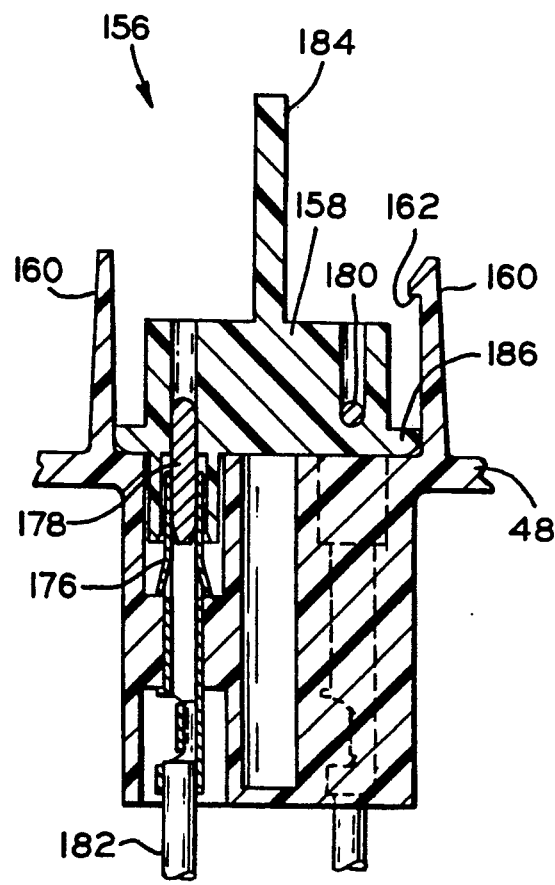
FIG_11
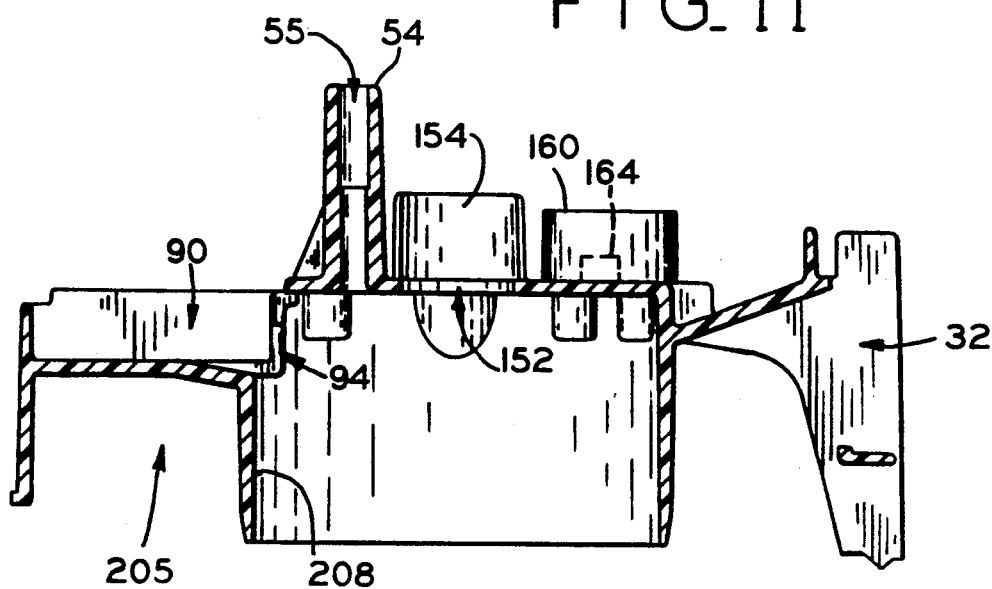
FIG_12

TWO COMPARTMENT MOTOR

BACKGROUND AND SUMMARY OF THE INVENTION

The present invention relates generally to electric motors and, more particularly, to a two compartment electric motor and a method of manufacturing a two compartment electric motor.

Single phase induction motors are manufactured in a variety of types and configurations. In addition to the stator, armature and other primary motor compartments, some types and configurations include electrical or electronic components which are used to modify operating characteristics for particular applications. Examples of such motors are resistance start, reactor start, capacitor start, permanent split capacitor, and capacitor start-capacitor run motors. These different types of motors are characterized by different speed-torque characteristics, and may be designed to provide different theoretical maximum efficiencies. For some applications, particularly those where high starting torque is required, part of the windings in a motor may be designed and arranged to serve as auxiliary or starting windings which are energized during initial excitation of the motor, but which are deenergized as the motor comes up to a predetermined speed. Deenergization of such windings is often accomplished by a centrifugal switch, or other appropriate device.

In some applications, and especially those applications of motors used to drive pumps such as jet pumps or swimming pool pumps, capacitors, circuit controlling switches (e.g., speed control switches, voltage control switches, overload devices, etc.), and other electrical components are mounted to one of the motor end frames to facilitate access thereto. To provide protection from moisture, dust and other contaminants, such components are often mounted in a closed "control compartment" which is disposed immediately adjacent the "motor compartment" which houses the armature and other primary motor components.

U.S. Pat. No. 4,593,163, which is commonly assigned to the assignee of the present invention, discloses a two compartment motor in which components such as a starting capacitor, a thermal protector, a terminal board and motor circuit controlling switch assembly (e.g., a starting switch assembly), and a manually actuable switch are mounted to an end shield of an induction motor assembly. A thermoplastic molded cover is fastened to the motor with axially directed mounting screws. The end shield to which the components are mounted and the molded plastic cover define a "control compartment" in which the subject electrical components are housed.

An object of the present invention is to provide an improved two compartment motor design.

Another object of the present invention is to provide a two compartment motor design which may be more easily and reliably manufactured.

Yet another object of the present invention is to provide a two compartment electric motor design which includes a control plate in the control compartment to which a plurality of electrical components may be conveniently mounted.

Yet another object of the present invention is to provide a two compartment motor design in which a plurality of electrical control components may be premounted to a control plate to form a sub-assembly prior to the assembly of the control compartment of the motor.

Still another object of the invention is to provide a two compartment motor with improved ventilation features which may be integrally formed in the control plate.

These and other objects of the invention are achieved in a two compartment motor which comprises a frame, a pair of end shields disposed adjacent opposite ends of the frame to define a first compartment, stator windings supported by the frame within the first compartment, an armature rotatably supported by the end shields and disposed within the first compartment adjacent the stator windings, a cover mounted to the motor adjacent one of the end shields to define a second compartment between the cover and the end shield, and a control assembly mounted within the second compartment. The control assembly comprises a control plate, a plurality of electrical components, and mounting means for securing the electrical components in position on the control plate. In one embodiment of the invention, the control plate is a molded plastic component and the mounting means is integrally formed or molded with the control plate. The electrical components may include a starting capacitor. In this case, the control plate may be formed with opposed, integrally molded, resilient fingers for securing the starting capacitor to the control plate. The components may also include a voltage selection switch, and at least a portion of the switch may be integrally molded with the control plate. Similar switches may be provided for speed selection or other purposes.

The components mounted to the control plate may also include an overload device, and one or more electrical terminals used, for example, as a termination point for electrical conductors supplying power to the motor. In the case of the overload device, the control plate includes integrally formed means, such as one or more openings to receive threaded fasteners, for securing the overload device to the control plate. The control plate may also be provided with a plurality of integrally formed ventilation openings for providing a flow of ventilating air to or from the motor.

In one embodiment of the invention, the armature includes a shaft which extends into the second compartment and through the control plate. An integrally formed shield to guard against unintended contacts between this portion of the shaft and the electrical components and conductors within the second compartment may be provided on the control plate. This embodiment of the motor further comprises a centrifugal switch assembly having a rotatable portion mounted on the shaft. An integrally molded recess for receiving and shielding the rotatable portion of the centrifugal switch assembly is provided on one side of the control plate. An actuator portion of the switch may be mounted by means of integrally formed mounting means to an opposing side of the control plate. An opening in the control plate is provided to allow interaction between the actuator portion of the switch assembly and the rotatable portion to control an electrical circuit.

The control plate may also be provided with a recess for receiving mating electrical conductors which electrically connect the stator windings to one or more of the electrical components in the second compartment. In this embodiment, a first electrical connector is provided and connected by conductors to at least one of the electrical components in the second compartment. This conductor may extend through an opening in the control plate such that the connector is disposed between the control plate and the adjacent end shield. A second connector is provided and is connected by conductors to the stator windings. These conductors extend through an opening in the end shield such that the second connector is also disposed between the control plate and the end shield. The control plate is formed with an integrally molded recess adapted to receiving the mated first and second connectors.

Another aspect of the present invention relates to the end shield which lies adjacent the cover to define the second compartment and which has a "skeleton" construction. This end shield comprises a central portion, a circumferential rim portion, and a plurality of radially extending spokes connecting the central portion to the circumferential rim portion. The end shield is provided with at least one relatively large opening between the central and circumferential rim portions and between adjacent ones of the radially extending spokes to allow for the passage of ventilating air and electrical conductors from the first to the second compartments. The central portion of the end shield comprises a first recess on a first side thereof for receiving an armature supporting bearing therein. A second recess may be provided on a second, opposing side thereof for providing clearance for the rotating portion of the centrifugal switch assembly. The end shield may also be provided with an integrally formed conduit receiving opening. The end shield is preferably formed of a one-piece construction from a material such as cast aluminum. The conduit receiving opening is formed in an upstanding portion of the casting. A step-like shoulder is provided around at least a portion of the conduit opening and is adapted to interact with an edge of the cover to provide a seal to prevent entry of dust, moisture and other contaminants. At least one locating boss may be formed on either the circumferential rim portion or on one of the spokes of the end shield to provide a mechanism for aligning the end shield and the control plate in a preferred relative orientation.

In one embodiment of the invention, the cover comprises a one-piece, molded plastic element. An integrally molded shield may be provided on an interior surface of the cover for shielding an end portion of the rotating shaft of the armature from the electrical components and conductors in the second compartment. The shield comprises a generally arcuately shaped element extending around at least a portion of the rotating shaft. The cover is a cup-shaped element having a peripheral edge formed to abut portions of the control plate and the adjacent end shield so as to effectively define the second compartment and shield the electrical components from view and contamination.

In one embodiment of the invention, the voltage or speed selection switch, which may be among the plurality of components on the control plate, comprises a movable portion and a stationary portion. The stationary portion is integrally formed in the control plate. This portion comprises at least one electrical terminal mounted in the control plate and adapted for mating with an electrical conductor in the movable portion. In a preferred embodiment of the switch, at least two electrical terminals are mounted in the control plate, and conductor means for electrically connecting the terminals is provided in the movable portion. The switch means has a plurality of engaged positions wherein the movable portion is electrically engaged with the stationary portion, and a disengaged position wherein the movable portion is selectively movable to or between first and second engaged positions. The stationary portion comprises one or more arcuate portions which extend outwardly from the control plate. The movable portion is disposed adjacent the control plate within an area defined by the arcuate portions. At least one of the arcuate portions has an inwardly and transversely extending lip for engaging an edge portion of the movable switch portion to prevent the movable switch portion from being easily removed from the immediate vicinity of the control plate.

A preferred method of making a two compartment motor constructed in accordance with the present invention comprises the steps of: mounting the plurality of control components to the control plate; mounting the stator windings within the frame; rotatably supporting the armature between the end shields and attaching the end shields to the frame such that the frame and the end shields define a first compartment and the stator windings and armature are disposed within the first compartment; mounting the control plate adjacent one of the end shields and electrically connecting one or more of the plurality of components to the stator windings; and mounting the cover adjacent the control plate and end shield to define the second compartment which encloses the control plate and components. The method may include the additional step of forming the control plate with integral means for mounting at least one of the plurality of control components to the control plate. Additional steps may include interconnecting the plurality of control components with a plurality of electrical conductors, terminating one or more of the conductors in a first electrical connector, connecting the stator windings to a second electrical connector, and matingly connecting the first and second electrical connectors. The control plate may be specially formed for receiving the mated first and second connectors to secure the connectors in position between the end plate and the control plate. The forming step may also include forming at least a portion of a voltage or speed control switch integrally with the control plate. An additional step may involve mounting a rotatable portion of a centrifugal switch on a shaft of the armature between the control plate and the adjacent end shield. In this case, the forming step may additionally comprise forming the control plate to include means for mounting a stationary portion of the centrifugal switch to the control plate.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a two compartment motor constructed in accordance with the principals of the present invention.

FIG. 2 is a bottom view of the two compartment motor of FIG. 1.

FIG. 3 is a partially exploded view of the motor of FIGS. 1 and 2.

FIG. 6 is a plan view of one side of a control plate, without components, constructed in accordance with the principals of the present invention.

FIG. 7 is a plan view of the control plate of FIG. 6 with electrical components mounted thereon.

FIG. 8 is a plan view of the other side of the control plate of FIG. 6.

FIG. 9 is a plan view of the other side of the control plate of FIG. 7.

FIG. 10 is a partial plan view of the control plate of FIG. 7 showing the voltage control switch set in the low position.

FIG. 11 is a cross-sectional view taken along line 11—11 of FIG. 10.

FIG. 12 is a cross-sectional view taken along line 12—12 of FIG. 6.

DETAILED DESCRIPTION OF THE DRAWINGS

Figure 4:
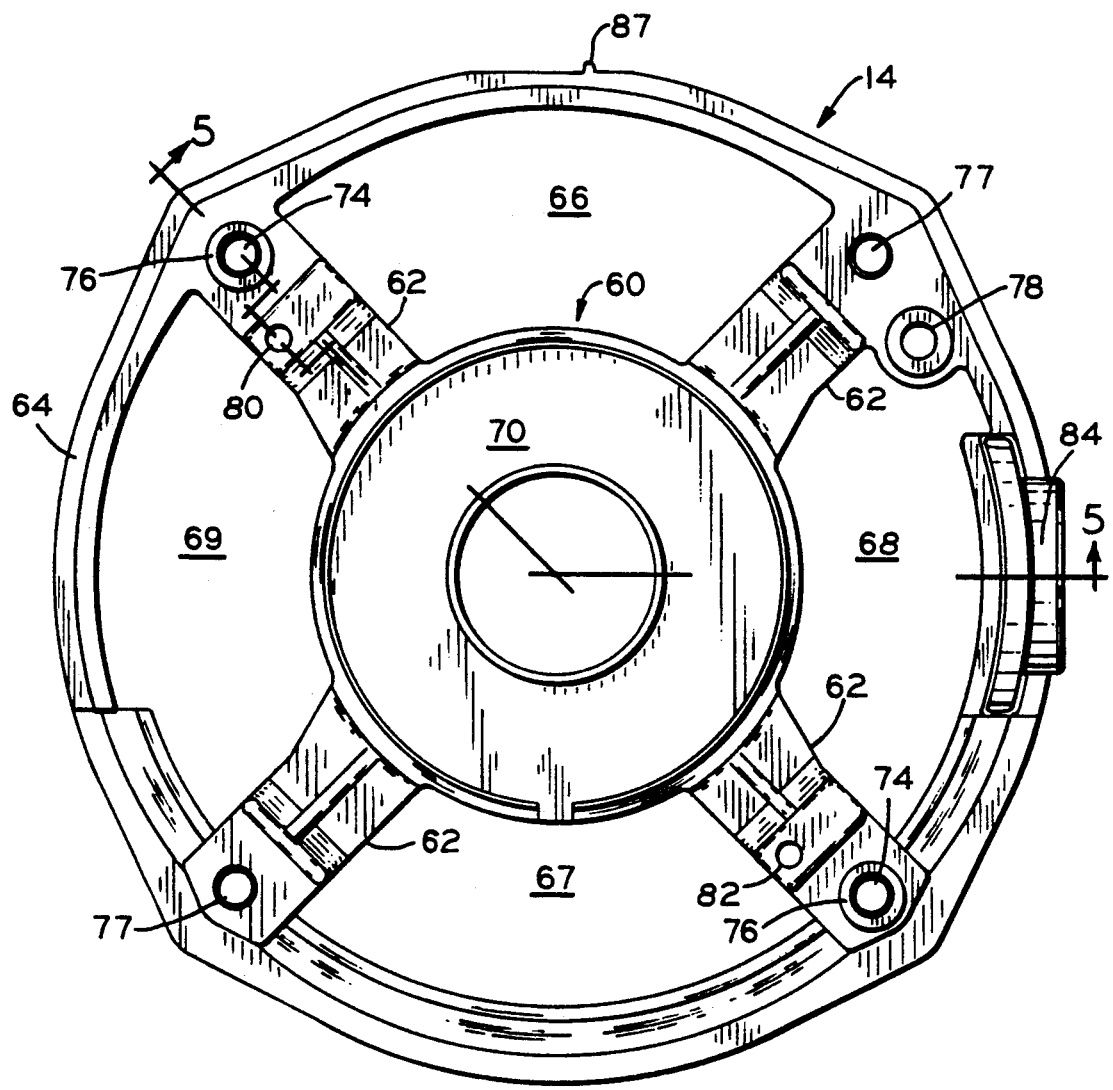
FIG. 4 is a plan view of an end plate for a motor constructed in accordance with the present invention.

FIG. 1 shows a perspective view of a two compartment motor 10 constructed in accordance with the present invention. Motor 10 has a first compartment which is defined by a first end shield 12, a second end shield 14 and a generally cylindrical frame 16. Frame 16 provides support for stator windings (shown in FIG. 3), while end shields 12 and 14 are fitted with bearings to rotatably support an armature assembly within the first compartment adjacent the stator winding, as is well-known in the art. Armature shaft 18 extends from one end of motor 10 and is threaded, keyed or otherwise adapted for coupling to a load. End shield 12 is provided with a plurality of mounting lugs 20 which are used to securely mount motor 10 in operating position adjacent the load.

Motor 10 includes a second compartment (which may be referred to as the control compartment) which is generally defined by end shield 14 and a molded plastic cover 22. As discussed in more detail below, the control compartment is used to house a plurality of electrical components used in the control and operation of motor 10. Cover 22 is secured to motor 10, as illustrated in more detail in FIG. 3, by threaded, hex-head screw 24. Electrical access to the control compartment is provided by a conduit receiving opening 26 which is integrally formed in end shield 14.

FIG. 2 is a bottom view of motor 10 in which a plurality of vent openings 28, 30 and 32 are visible. Openings 28, 30 and 32 are integrally formed in a control plate which will be described in detail in connection with FIGS. 6-9 below. Openings 28 and 30 are relatively short, narrow openings which extend from the lateral portions of the bottom of motor 10 to the lower regions of opposing sides of motor 10, as shown in FIG. 1. Openings 32 are relatively long and wide openings which are laterally centered along the bottom of motor 10. This arrangement is intended to provide adequate ventilation and air discharge channels for the motor, while reducing contamination of the two motor compartments with dust and moisture.

FIG. 3 shows an exploded view of motor 10 in which the major components are visible. The upper left-hand portion of FIG. 3 shows the major components which define the first compartment of two compartment motor 10. These components include end shield 12, frame 16 and end shield 14. As noted above, stator windings 34 are supported by frame 16 within the first compartment. An armature 36 is rotatably supported by end shields 12 and 14 adjacent stator windings 34. Armature shaft 18 extends from the first compartment through end plate 12 for connection to a load as previously discussed. On the other end of motor 10, shaft 18 extends through end shield 14 into the second compartment defined by cover 22 and end shield 14. This end of shaft 18 is provided with a slot 38 and wrench flats 40 to facilitate manual rotation of, or to secure against rotation of, armature 36 after the opposing end of shaft 18 is connected to a load. Shaft 18 is also provided with two circumferential grooves 42 which accept two locking clips 44. Clips 44 secure centrifugal speed switch assembly 46 in position on shaft 18. A plurality of electrical conductors 43, which are electrically connected to stator windings 34, extend from the first compartment through end plate 14 and terminate in an electrical connector 45.

Mounted within the second compartment of motor 10 is a control plate 48 which, in the embodiment illustrated, is a one-piece molded plastic structure which provides a mounting base for securing a plurality of electrical components used in the control and operation of motor 10 in position within the second compartment. The exact structure of the illustrated embodiment of control plate 48 will be discussed in detail in connection with FIGS. 6-9 below. Control plate 48 is mounted to motor 10 by a pair of long bolts 50 which extend through control plate 48, end shield 14 and frame 16 to engage threads formed in end shield 12. An eyelet 51 is provided between control plate 48 and end shield 14 (see FIGS. 8 and 9). Alternatively, control plate 48 can also be secured by nuts threaded onto the ends of bolts which extend through end shield 12, frame 16, end shield 14 and control plate 48. Bolts 50, along with an additional pair of bolts 52, also serve to secure end shields 12 and 14 to frame 16. In the assembly process, this arrangement allows control plate 48 to be separately mounted to the sub-assembly which includes the first compartment of motor 10. Separate, shorter mounting bolts may also be used to secure control plate 48 to, for instance, threaded holes in end shield 14.

In the illustrated embodiment, cover 22 mounts, via screw 24 which extends through opening 25, to a threaded screw-receiving boss 54 which is an integrally formed element of control plate 48. Although screw 24 is shown separated from cover 22 in the partially exploded view of FIG. 3, screw 24 is preferably "captured" in opening 25 so as to remain with cover 22 upon removal from motor 10. In this embodiment of the invention, both cover plate 48 and cover 22 are molded plastic components.

Also shown in FIG. 3 is a ground screw 53 which threads into an opening in boss 78 of end shield 14 to provide a convenient means by which to connect the metal components of motor 10 to a ground wire (shown in dashed lines) provided by the user.

Figure 5:
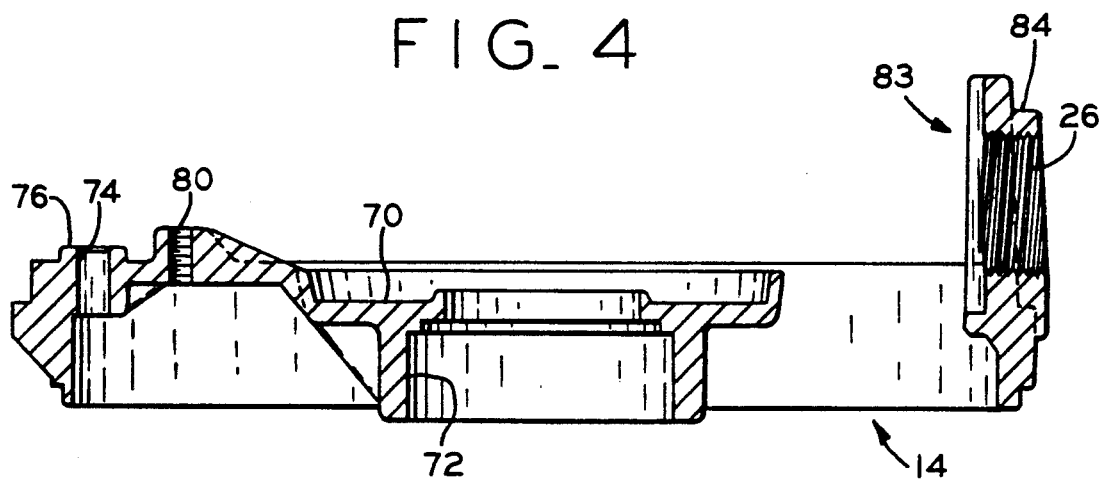
FIG. 5 is a cross-sectional view of the end plate of FIG. 4.

FIG. 4 is a plan view of end shield 14 of motor 10. End shield 14 utilizes a "skeleton" design which includes a central portion 60, four radially-extending spokes 62 and a circumferential portion 64. This arrangement provides relatively large openings 66-69 for the passage of ventilating air and power conductors through end shield 14. With reference to FIGS. 4 and 5, central portion 60 of end shield 14 includes a generally circular, annular recess 70 which faces away from armature 36 when end plate 14 is assembled in motor 10. Recess 70 provides clearance for centrifugal switch assembly 46. Central portion 60 further includes, on the side of end shield 14 which faces the armature, a machined recess 72 which is adapted to receive the bearing (not shown) which supports the respective end of armature 36.

End shield 14 is provided with four holes for receiving mounting bolts 50 and 52. Holes 74, which receive bolts 52, are provided with integrally formed bosses 76 which provide a bearing surface for the heads of bolts 52, and which allow for use of a common bolt length. Mounting holes 77 are formed flush (i.e., without bosses) to provide a flat mating surface for control plate 48. Clearance openings 188 and 202 (FIG. 6) are provided in control plate 48 for bosses 76 and the heads of bolts 52. An additional raised projection or boss 78 is provided as an additional locating and orientation landmark for control plate 48, and provides a grounding point for connecting the metallic elements of motor 10 to a user supplied ground wire (see FIG. 3). Openings 80 and 82 are provided in an opposing pair of spokes 62 to allow control plate 48 to be mounted directly to end shield 14, independently of bolts 50, if desired. This arrangement allows for the possibility that the motor may be shipped as a "parts" motor without end shield 12.

Figure 14:
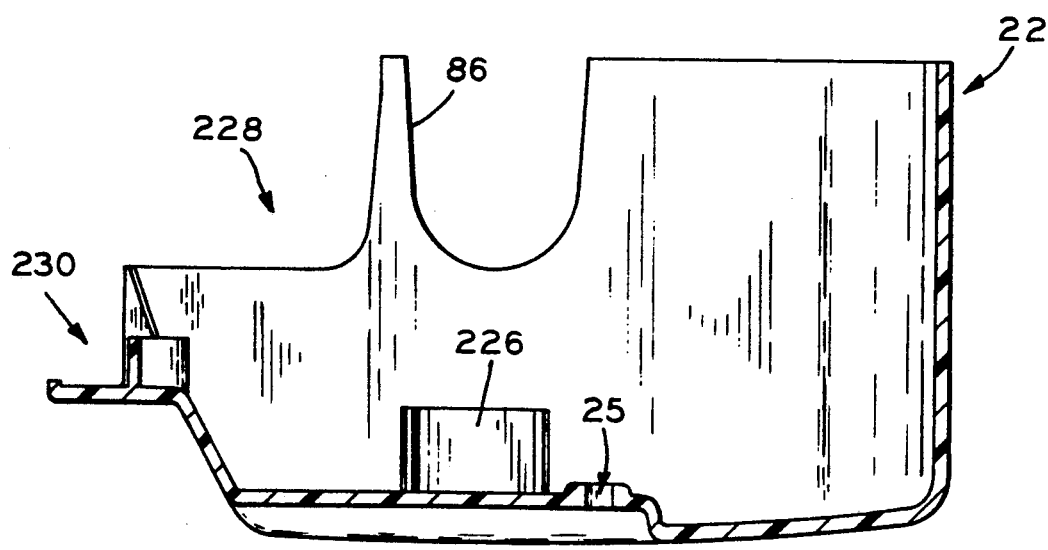
FIG. 14 is a cross-sectional view taken along line 14—14 of FIG. 13.

An additional feature of end shield 14 is integrally formed conduit receiving opening 26. Opening 26 is integrally formed in an upstanding portion 83 of end shield 14. Opening 26 is threaded to receive a conduit nipple to facilitate connection of the motor to an external power source. A recessed shoulder 84 is formed around three sides of opening 26 to mate with a similarly shaped cut-out 86 (FIGS. 3 and 14) in cover 22 to provide a step flange-type seal around the three sides of opening 26.

End shield 14 is also provided with a raised projection 87 on the outwardly facing side surface of circumferential portion 64. Projection 87 extends substantially parallel to the longitudinal axis of motor 10 across substantially the full width of circumferential portion 64 of end shield 14. The function of projection 87 is to provide an alignment and anti-rotation feature for a separately mounted "bonding lug" such as is commonly used in the swimming pool industry.

In the embodiment of the invention illustrated, end shields 12 and 14 are formed in one piece of a metallic material, such as cast aluminum.

FIGS. 6 and 7 show plan views of the exterior side of control plate 48, without and with a plurality of electrical components mounted thereon, respectively. The various features of control plate 48 and the components will be described with reference to FIGS. 6 and 7, starting at the top or twelve o'clock position, as viewed in the figures, and moving clockwise around the plate. Near the top of plate 48 is an area 90 for mounting a portion of a centrifugal switch 92. Centrifugal switch 92 has an actuator portion (210 in FIG. 9) which extends through an opening 94 formed in plate 48. Mounting holes 96 and 98 are also provided in plate 48 to receive screws 100 and 102 which secure centrifugal switch 92 in position. The top surface 104 of centrifugal switch 92 is provided with a plurality of slots (e.g., 106), some of which receive male terminals (e.g., 108 and 110). In the embodiment shown in FIG. 7, two of these male terminals are shown connected to female terminals 112 and 114 which, in turn, are connected to electrical conductors 116 and 118, respectively. Openings 99 and 101 are provided in control plate 48, as shown in FIG. 6, to allow conductors such as conductors 116 and 118 to pass through control plate 48, as will be described in additional detail below. The base of centrifugal switch 92 serves to close and seal lead openings 99 and 101 so that separate seal structures in connection with these openings are not needed. An outwardly projecting post 103 and an inwardly (i.e., into area 90) projecting member 105 are provided to serve as locating and orienting aids for switch 92.

Immediately below centrifugal switch 92 is integrally molded boss 54 which, as previously discussed in connection with FIG. 3, receives screw 24 to secure cover 22 in position. A pair of reinforcing gussets 120 and 122 are integrally molded to provide additional support for boss 54.

Immediately adjacent centrifugal switch 92 is an opening 124 for one of the two mounting bolts 50. Adjacent opening 124 is a larger opening 126 which provides clearance for boss 78 of end plate 14.

Adjacent opening 126, at approximately the three o'clock position, is a passageway 128. Passageway 128 is integrally formed in control plate 48 and is aligned, when motor 10 is assembled, with conduit receiving opening 26 of end shield 14. Passageway 128 provides access to the interior of the control compartment for a plurality of conductors (e.g., 130 and 132) through opening 126. Leads 130 and 132 terminate in female terminals 134 and 136. Female terminals 134 and 136 mate with upwardly extending (i.e., out of the page) blade portions of S-shaped terminals 138 and 140, respectively. With reference to FIG. 6, three sets of mounting openings are provided for the S-shaped terminals. Each set includes a relatively small opening 142 which is sized to receive a rivet, screw or other fastening device 143 to mechanically secure the terminals to control plate 48. Each set further includes a larger recess 144 to provide clearance for terminal screws, such as screws 146 and 148, which may be used to secure spade terminals or other conductors in electrical contact with the S-shaped terminals. Finally, each set of mounting openings includes a rectangular slot 150 which receives a downwardly extending (i.e., into the drawing) male terminal which extends through control plate 48 for mating with a female terminal on the other side of control plate 48 (see FIG. 9). S-shaped terminals 138 and 140 include a "lance" portion (not shown) to partially secure them to control plate 48.

In the center of control plate 48 is an opening 152 which provides clearance for armature shaft 18. Immediately adjacent opening 152 is an arcuate shield 154 which extends outwardly from control plate 48 (i.e., out of the drawing in FIGS. 6 and 7) Shield 154, in conjunction with shield 226 of cover 22 (see FIG. 13), serves to shield terminals 134 and 136 and conductors 130 and 132 from rotating armature shaft 18.

Adjacent passageway 128 is a voltage selector switch 156 shown with (FIG. 7) and without (FIG. 6) movable switch portion 158. An enlarged, cross-sectional view of switch 156 is shown in FIG. 11. Switch 156 includes an outwardly extending arcuate portion 160 having inwardly and transversely extending lips 162 near the top thereof to prevent or limit complete removal of portion 158 from its position adjacent plate 48. A separate arcuate shaped portion 164 is formed between the opposing ends of arcuate portion 160 to provide two gaps 166 and 168. Within the circular area defined by arcuate portion 160 and 164 are a plurality of openings 170–174. At least some of these openings (i.e., 170–173) are fitted with electrical terminals, an exemplary one of which is shown in the enlarged cross-sectional view of FIG. 11, and is designated by reference numeral 176. The female ends of each of the terminals 176 receive one end of U-shaped conductors 178 and 180 which are part of movable portion 158. When movable portion 158 is engaged in the high position (FIG. 7), conductors 178 and 180 connect a first set of terminals 176. When movable portion 158 is engaged in the low position (FIG. 10), different pairs of terminals 176 are connected. The opposite ends of terminals 176 extend through plate 48 and are connected, such as by crimping, to electrical conductors illustrated, for example, by conductor 182.

Switch 156 is operated (i.e., moved from the high to low position or vice-versa), by grasping upstanding portion 184 of movable portion 158 and pulling portion 158 outwardly to disengage conductors 178 and 180 from terminals 176 until edge portion 186 of portion 158 contacts lips 162. Movable portion 158 is then rotated to the desired position and moved inwardly to engage the ends of U-shaped conductors 178 and 180 into terminals 176. This arrangement provides an easy, convenient and inexpensive mechanism for selecting between high and low voltage settings. If desired, additional switch mechanisms of this type may be provided for, among other things, speed selection.

Adjacent switch assembly 156 is an opening 188 to provide clearance for boss 76 and the head of bolt 52. Also adjacent switch 156 is opening 190. Opening 190 aligns with opening 82 in end shield 14, and provides means by which secondary retention of control plate 48 can be achieved for applications in which end shield 12 is not required.

Near the bottom (i.e., the six o'clock position) of plate 48 are the plurality of relatively large vent openings 32. These vent openings, in combination with the open "skeletal" construction of end shield 14, ensure adequate ventilation of motor 10. These features further allow for simplified compliance with U.L. standards regarding molten metal protection. The integrally formed air channels in control plate 48 improve the air intake and discharge capabilities of the motor, resulting in reduced motor operating temperature rises.

Adjacent vent openings 32 is a mounting hole 192 which receives one of the bolts 50 for mounting plate 48 to end shield 14. Adjacent mounting hole 192, at approximately the nine o'clock position, are a plurality of integrally formed resilient fingers 194 which extend upwardly from control plate 48 (i.e., out of the drawings in FIGS. 6 and 7) which receive and hold starting capacitor 196 in position. Additional L-shaped projections 198 are also provided to locate capacitor 196 axially within the resilient grip of fingers 194. A plurality of molded projections 200 serve as stand-offs to laterally position capacitor 196 within the grip of fingers 194.

Adjacent integrally molded capacitor retaining fingers 194 is opening 202 which provides clearance for boss 76 and the head of mounting bolt 52. Adjacent opening 202 is opening 204. Opening 204 aligns with opening 80 in end shield 14 to provide an alternative means for securing control plate 48 to end shield 14.

FIGS. 8 and 9 show, respectively, the interior or back side of control plate 48. The features of the back side of plate 48 will be discussed beginning at the top or twelve o'clock position and moving counterclockwise around the circumference of plate 48. To the extent features discussed in connection with FIGS. 6 and 7 are shown unchanged in FIGS. 8 and 9 (for example, mounting holes 96 and 98, openings 124 and 126, etc.), such features are identified with like reference numbers in all figures, but are not separately discussed below.

A recess, generally indicated by reference numeral 205, is provided near the top of control plate 48 to accommodate a multi-terminal electrical connector 206 which is configured to mate with electrical connector 45 (FIG. 3) which, in turn, is connected to conductors 43 which extend into the first or motor compartment of motor 10. Connector 206 is connected to a plurality of electrical conductors which, in turn, are connected to various ones of the electrical components mounted on control plate 48, including one or more of the conductors extending through opening 99. Conductors may also extend through opening 101 which is located on the opposite side of open area 205. Electrical connectors 45 and 206 allow the electrical components on control plate 48 to be conveniently and reliably connected to the other major components (e.g., stator windings 34) of motor 10 in a single operation to improve the quality and manufacturability of the motor.

Inwardly of recess 205 and opening 94 is an annular wall 208 which extends 360° around an inner circumference of plate 48. The inner surface of wall 208 defines a protected space for centrifugal speed switch assembly 46. Extending into this space through a portion of opening 94 is actuator 210 which interacts with a rotating portion of switch 46 to open or close an electrical circuit, via centrifugal switch 92, when armature 36 reaches a specified rotational speed.

Adjacent recess 205 is opening 124 for one of the two mounting bolts 50. Both opening 124 and diagonally-disposed opening 192 are countersunk, as illustrated in FIG. 8, to receive metal eyelets 51 as illustrated in FIG. 9. Eyelets 51 better distribute the stresses placed upon control plate 48 by the heads of bolts 50.

At the nine o'clock position in FIGS. 8 and 9 is the back surface 129 of passageway 128. Surface 129 is generally smooth and concavely curved (i.e., out of the paper) along either side of an axis which extends horizontally through the center of control plate 48.

Inwardly of and on either side of surface 129 are opening 142 and recess 144 and slots 150 which were discussed in connection with FIGS. 6 and 7. Female terminals 212 and 214 are shown connected to the male ends (which are hidden from view by the female terminals) of S-shaped terminals 138 and 140. Fasteners (i.e., rivets) 143 are visible in FIG. 9.

Adjacent surface 129, and inwardly of vent openings 28, is the portion of switch 156 which is integrally formed With control plate 48. Switch 156 was previously discussed in connection with FIGS. 6, 7, 10 and 11 above. Adjacent switch 156 are openings 188 and 190, vent openings 32, opening 192 and vent openings 30, all of which have been previously discussed and will not be separately discussed in connection with FIGS. 8 and 9.

At approximately the three o'clock position, as viewed in FIGS. 8 and 9, is a space 216 which is provided for mounting a thermal overload device 218 to control plate 48. An integrally formed post 219 and a boss 220 with an opening 222 for receiving a fastener 224 are provided for mounting thermal overload 218. As with the other integrally formed features discussed above, post 219 and boss 220 are preferably molded of a plastic material to provide a one-piece, completely integrated structure.

FIG. 12 is a cross-sectional view of control plate 48 taken along line 12—12 of FIG. 6. Visible in FIG. 12 is upstanding arcuate portion 160. Portion 164 is shown in dashed lines. As is apparent in FIG. 12, portion 164 is substantially shorter than portion 160 to provide clearance for "pointer" 169 which extends somewhat from movable portion 158 beyond the inner perimeter of the arcuate portions to more clearly indicate the switch position. Also visible is shield 154 and boss 54 with opening 55 for receiving screw 24. Adjacent boss 54 is space 90 which receives centrifugal switch 92. Opposing space 90 is recess 205 which, as discussed above, is provided to receive electrical connectors 45 and 206. Finally, recess 208 which defines clearance space for centrifugal switch 46 is clearly shown in FIG. 12, as is opening 94 which provides clearance for actuator 210.

Figure 13:
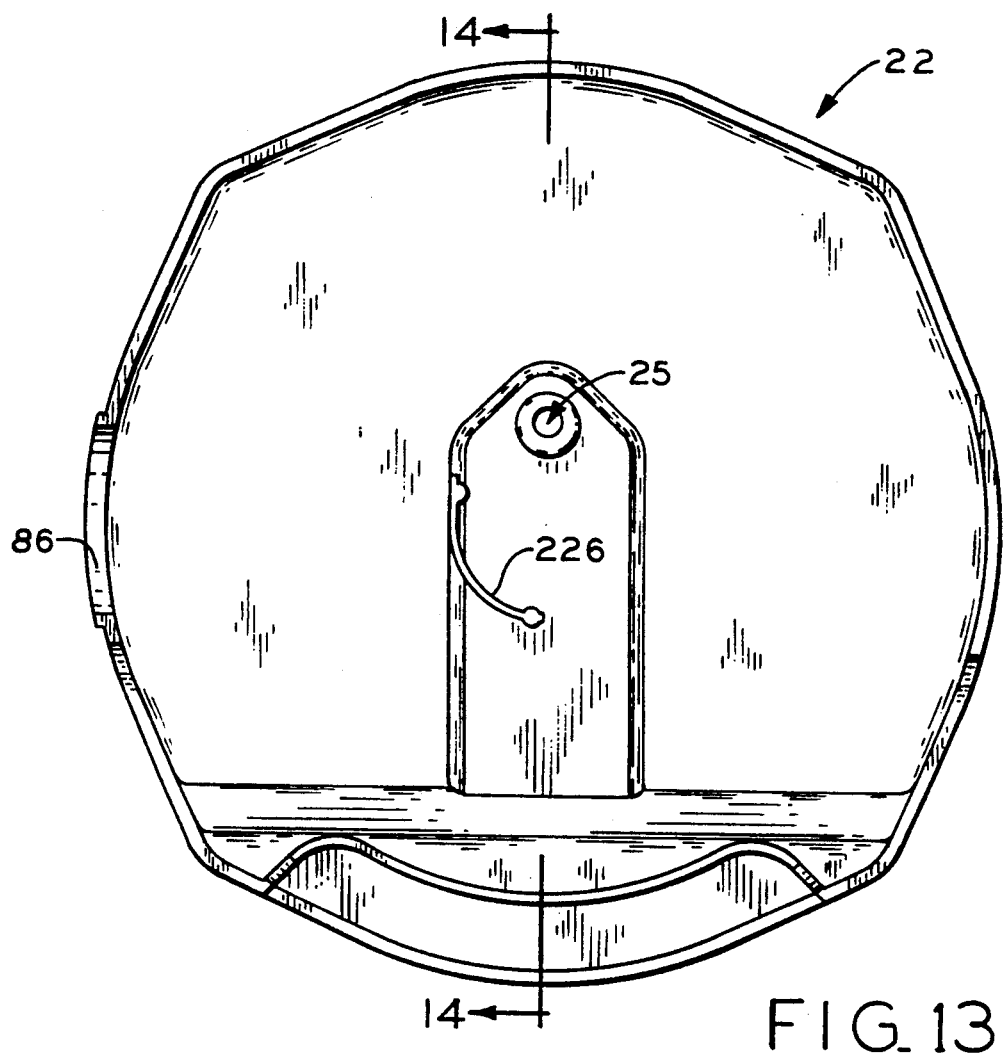
FIG. 13 is a plan view of the inside of a cover for one compartment of the two compartment motor of the present invention.

FIG. 13 shows an interior view of cover 22. Integrally molded in the interior of cover 22 is an additional shield 226 which cooperates with shield 154 to protect terminals, wiring and other electrical components from the exposed end of rotating armature shaft 18. The exterior contours of cover 22 in the areas generally designated by reference numerals 228 and 230 are molded to fit around and form a relatively tight seal with vent openings 28, 30 and 32. Cut-out 86, as previously discussed, conforms to recessed shoulder 84 of end shield 14. As is the case with control plate 48, cover 22, in the embodiment illustrated, is molded from a plastic material.

The arrangement of the present invention allows for efficient assembly of a high-quality two compartment motor. In the arrangement of the present invention, the electrical components referred to above, such as the thermal overload, the capacitor, the voltage selection switch, the actuator for the centrifugal switch, and the terminals and wiring are preassembled "off-line" with strict quality controls in a uniform and repeatable fashion. The parts of the motor which make up and are enclosed in the first compartment may be assembled in a standard manner, with "skeleton" end shield 14 mounted to allow conductors 43 to extend through the open portions of the end shield. The rotatable portion of a centrifugal switch may be mounted to the armature, if appropriate. The preassembled control board is then brought to the motor and electrical connectors 45 and 206 are connected in a single operation. The control board assembly is secured to either end shield or the frame. Cover 22 is then positioned and secured, such as by screw 24, to complete the assembly.

From the preceding description of the illustrated embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A two compartment motor, comprising:
a frame;
a pair of end shields disposed adjacent opposing ends of the frame to define a first compartment;
a stator winding supported by said frame within said first compartment;
an armature rotatably supported by the end shields and disposed within the first compartment adjacent the stator winding;
a cover mounted to the motor adjacent one of said end shields to define a second compartment between said cover and said end shield; and
a control plate mounted within said second compartments, said control plate comprising mounting means for securing a plurality of electrical components used in the control and operation of the motor in position within said second compartment;
wherein said control plate is a molded plastic component, and said mounting means for securing at least one of said plurality of components is integrally molded in said control plate; and
wherein said control plate further comprises at least one of: (a) an integrally molded portion of a switch, (b) an integrally formed passageway which is aligned with a conduit receiving opening formed in the end shield for providing access to the interior of the second compartment for a plurality of conductors, (c) a plurality of integrally formed ventilation openings for providing a flow of ventilating air to or from the motor, and (d) an integrally formed shield to guard against unintended contacts between the rotating armature and the electrical components and conductors within the second compartment.

2. A two compartment motor according to claim 1, wherein one of said electrical components comprises a starting capacitor, and wherein said control plate includes opposed integrally molded, resilient fingers for securing said starting capacitor to the control plate.

3. A two compartment motor according to claim 1, wherein said plurality of electrical components includes a speed selection switch, and wherein at least a portion of said switch is integrally molded with said control plate.

4. A two compartment motor according to claim 1, wherein said plurality of electrical components includes a voltage selection switch, and wherein at least a portion of said switch is integrally molded with said control plate.

5. A two compartment motor according to claim 1, wherein said plurality of electrical components includes an overload device, and wherein said control plate includes integrally formed means for mounting said overload device.

6. A two compartment motor according to claim 1, wherein said control plate is provided with a recess for receiving mating electrical connectors which electrically connect the stator winding to one or more of the electrical components in the second compartment.

7. A two compartment motor according to claim 1, further comprising first and second mating electrical connectors, said first connector being electrically connected to at least one electrical conductor which is also connected to at least one of the electrical components in the second compartment, and which extends through an opening in the control plate such that said first electrical connector is disposed between the control plate and the adjacent end shield, said second connector being electrically connected to at least one conductor which is also connected to the stator winding and which extends from the stator winding through the end shield such that said second electrical connector is disposed between the control plate and the end shield, and wherein said control plate is provided with a recess adapted to receive the mated first and second connectors.

8. A two compartment motor according to claim 1, wherein said end shield is formed of a one-piece construction from a castable metallic material.

9. A two compartment motor according to claim 1, wherein said cover comprises a one-piece, cup-shaped element having a peripheral edge formed to abut portions of said control plate and said adjacent end shield so as to effectively define said second compartment and shield the electrical components from view and contamination.

10. A two compartment motor according to claim 1, wherein said armature comprises a shaft which extends into the second compartment, and wherein said motor further comprises a centrifugal switch assembly having a rotatable portion mounted on said shaft.

11. A two compartment motor according to claim 10, wherein said control plate has an integrally molded recess portion for receiving and shielding the rotatable portion of the centrifugal switch assembly.

12. A two compartment motor according to claim 11, wherein said switch assembly further comprises an actuator portion, and wherein said control plate includes integrally formed mounting means for securing said actuator portion in position.

13. A two compartment motor according to claim 12, wherein said control plate has an opening formed adjacent said actuator portion, and opening into said recess, to allow said actuator portion of the switch assembly to interact with said rotatable portion of the assembly.

14. A two compartment motor according to claim 1, wherein said end shield adjacent said cover comprises a central portion, a circumferential rim portion, and a plurality of radially extending spokes connecting said central portion to said circumferential rim portion.

15. A two compartment motor according to claim 14, wherein said end shield is provided with at least one relatively large opening between said central and circumferential rim portions and between adjacent ones of said radially extending spokes for the passage of ventilating air and electrical conductors from the first to the second compartments.

16. A two compartment motor according to claim 14, wherein said central portion comprises a first recess on a first side thereof for receiving an armature-supporting bearing therein, and a second recess on a second, opposing side thereof for providing clearance for a rotating centrifugal switch assembly.

17. A two compartment motor according to claim 14, wherein said end shield adjacent said cover comprises at least one boss formed on said circumferential rim portion or on one of said spokes, and wherein said control plate comprises an opening adapted to receive said boss so as to align the end shield and control plate in a preferred relative orientation.

18. A two compartment motor according to claim 1, wherein said end shield adjacent said cover is provided with an integrally formed conduit receiving opening.

19. A two compartment motor according to claim 18, wherein said end shield further comprises a step-like shoulder formed around at least a portion of the conduit receiving opening and adapted to interact with an edge portion of the cover to provide a seal to prevent entry of contaminants.

20. A two compartment motor according to claim 1, wherein said cover comprises a one-piece, molded plastic element.

21. A two compartment motor according to claim 20, further comprising shield means integrally molded with an interior surface of said cover for shielding an end portion of a rotating shaft of the armature from the electrical components in the second compartment.

22. A two compartment motor according to claim 21, wherein said shield means comprises a generally arcuately-shaped element extending around at least a portion of said rotating shaft.

23. A two compartment motor, comprising:
a frame;
a pair of end shields disposed adjacent opposing ends of the frame to define a first compartment;
a stator winding supported by said frame within said first compartment;
an armature rotatably supported by the end shields and disposed within the first compartment adjacent the stator winding;
means adjacent one of said end shields for defining a second compartment; and
a control assembly mounted within said second compartment, said control assembly comprising a control plate, a plurality of electrical components, and mounting means for securing said electrical components in position on said control plate;
wherein said control plate is a molded plastic components, and wherein said mounting means for securing at least one of said plurality of components is integrally molded in said control plate; and
further comprising switch means having a movable portion and a stationary portion, and wherein said stationary portion is integrally formed in said control plate.

24. A two compartment motor according to claim 23, wherein said stationary portion comprises at least one electrical terminal mounted in the control plate and adapted for mating with a conductor in said movable portion.

25. A two compartment motor according to claim 23, wherein said stationary portion comprises at least two electrical terminals mounted in the control plate, and wherein said movable portion comprises conductor means for electrically connecting said electrical terminals.

26. A two compartment motor according to claim 23, wherein said switch means has an engaged position wherein said movable portion is electrically engaged with said stationary portion, and a disengaged position wherein said movable portion is rotatable relative to said stationary portion.

27. A two compartment motor according to claim 23, wherein said switch means has first and second engaged positions wherein said movable portion is electrically engaged with said stationary portion, and a disengaged position wherein said movable portion is selectively movable between said first and second engaged positions.

28. A two compartment motor according to claim 23, wherein said stationary portion comprises an arcuate portion extending outwardly from said control plate, and wherein said movable portion is disposed adjacent said control plate within an area defined by said arcuate portion.

29. A two compartment motor according to claim 28, wherein said arcuate portion has an inwardly and transversely extending lip for engaging an edge portion of said movable portion to prevent said movable portion from being removed from the immediate vicinity of said control plate.

* * * * *